United States Patent [19]

Cayol et al.

[11] 3,801,449
[45] Apr. 2, 1974

[54] NUCLEAR REACTOR FUEL ELEMENT
[75] Inventors: Andre Cayol, Aix en Provence;
Georges Clottes, Manosque, both of France
[73] Assignee: Commissariate A L'Energie Atomique, Paris, France
[22] Filed: May 11, 1971
[21] Appl. No.: 142,315

[30] Foreign Application Priority Data
May 22, 1970 France .................. 70.18869

[52] U.S. Cl..................... 176/68, 176/77, 176/79, 176/81
[51] Int. Cl................................ G21c 3/18
[58] Field of Search .............. 176/68, 79, 81, 77

[56] References Cited
UNITED STATES PATENTS
3,466,226   9/1969   Lass .................................. 176/68
3,392,438   7/1968   Coulter et al. ................. 176/79 X
3,180,804   4/1965   Flora et al. ....................... 176/79
3,460,236   8/1969   Shoudy ........................... 176/68 X
3,352,757   11/1967  Dee et al. ......................... 176/68

Primary Examiner—Carl D. Quarforth
Assistant Examiner—E. E. Lehmann

[57] ABSTRACT

A fuel element which is constituted by a vertically-disposed leak-tight can containing a column of pellets of fissile or fertile material carried by a rigidly fixed bearing member having at least one axial duct essentially comprises an intermediate component which is slidably mounted between the column and the bearing member. Longitudinal grooves are formed in the cylindrical wall of the intermediate component and communicate with radial grooves formed in the flat end faces of the component.

4 Claims, 3 Drawing Figures

PATENTED APR 2 1974 3,801,449

NUCLEAR REACTOR FUEL ELEMENT

This invention relates to a nuclear reactor fuel element and more particularly to a fuel element of the type which is intended to be placed vertically within a leak-tight can and made up of a column of stacked pellets which rests on a bearing member, a space for the collection of fission gases being provided within the can.

Fuel elements of this type which are commonly referred to as "fuel pins" are employed in fast reactors. When the coolant is circulated upwards within the reactor core as is usually the case in reactors of this type, the space which must be provided in order to collect the fission gases and limit the internal pressure is formed within the can beneath the bearing member, that is to say at a location in which the operating temperature has the lowest value. A passageway must be formed in the bearing member in order that the fission gases may be permitted to flow from the column of pellets towards the collection space. It is clearly important to ensure that this passageway is not clogged with pellet debris or fission products which originate from the column of fuel pellets and are condensed at the level of the bearing member at which the temperature is lower than in the column. It is also necessary to ensure that the bearing member provides a stable seating for the column of fuel pellets.

The fuel elements which have been employed up to the present time and in which the fuel column is supported directly on the bearing member as constituted by an intermediate plug which is secured to the can fail to satisfy all the conditions mentioned above. In particular, the passageway which usually consists of a single bore formed in the axis of the plug can be partially clogged with debris or condensations. In point of fact, the attachment of the plug to the can makes it difficult to provide for passageways other than a bore or a number of bores which are parallel to the axis.

The aim of the invention is to provide a nuclear fuel element of the above-mentioned type which conforms to practical requirements more effectively than comparable elements of the prior art, especially insofar as the disadvantages of these latter are either removed or mitigated to a very appreciable extent.

To this end, the invention proposes a fuel element which is intended to be employed vertically and comprises within a leak-tight can a column of pellets carried by a bearing member which is rigidly fixed to said can and pierced by at least one passageway which is parallel to the axis of the fuel element and opens into a gas-collection space beneath said bearing member, wherein said fuel element essentially comprises an intermediate component which is slidably mounted within the can between the column and the bearing member, longitudinal grooves being cut in the cylindrical wall of said intermediate component in order to establish a communication between the two sides of said component and radial grooves being cut in the flat end faces of said component so as to open into said longitudinal grooves.

The grooved intermediate component constitutes a baffle and this latter provides the fission gases with a number of leak paths which are not likely to be obstructed. If the passageway formed in the bearing member is axial, the radial grooves of that flat face of the intermediate component which is in contact with the bearing member open into said passageway. If said axial passageway is replaced by a plurality of bores spaced at uniform intervals about the axis of the bearing member, the radial grooves of the bottom face of the intermediate component can be completed by a circular distribution groove.

The intermediate component is advantageously provided on each face with two crossed radial grooves and these latter open into longitudinal grooves which are parallel to the axis. This arrangement permits of simple fabrication by such processes as precision microcasting or sintering (this latter solution entails lower capital expenditure). In the case last mentioned, the component can be formed especially of stainless steel.

It is readily apparent that, in the foregoing definition, the term "fuel element" must be interpreted as being applicable both to an element in which provision is made for a single column of fissile material and to elements in which provision is made for a plurality of columns disposed one above the other and constituted, for example, by fissile material and fertile material in alternate sequence as well as to elements which only contain fertile material.

In the case of a plurality of superposed columns carried by separate bearing members, a single collection space can be provided beneath the lowermost bearing member.

A clearer understanding of the invention will be obtained from the following description of fuel elements in accordance with the invention which are given by way of example without implying any limitation. The description relates to the accompanying drawings, in which.

Figures 1, 2, 3:
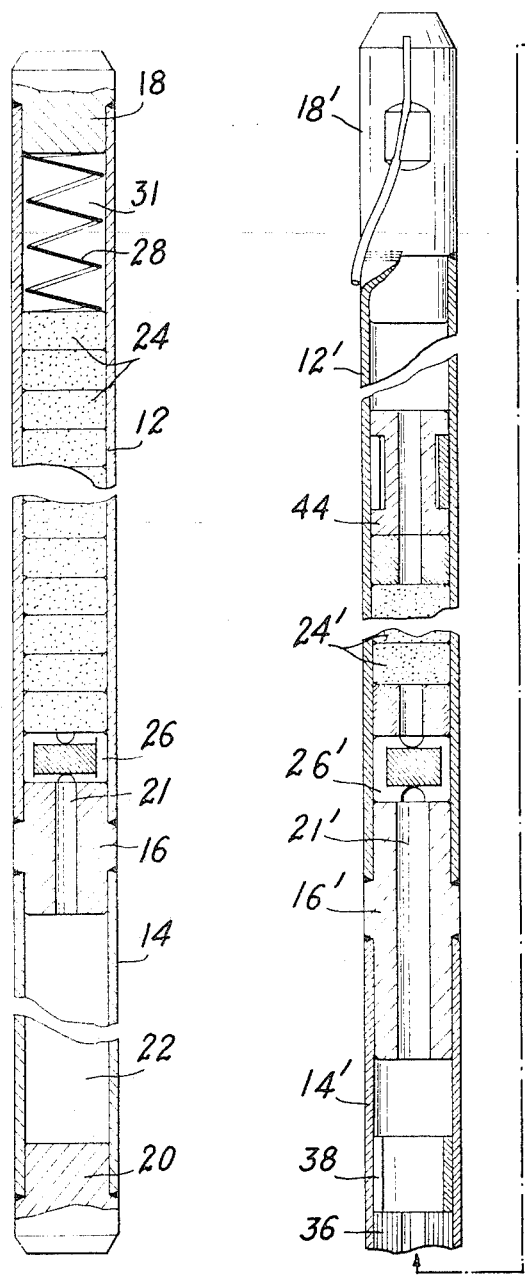
FIG. 1 is a highly diagrammatic sectional view of a fuel element.
FIG. 2 is a detail view in perspective and on a larger scale showing the intermediate component of the fuel element of FIG. 1.

FIG. 3 which is similar to FIG. 1 shows a second fuel element.

The fuel element which is illustrated in FIG. 1 is intended to be employed in a fast reactor which is cooled by an upward circulation of liquid sodium. The fuel element comprises a leak-tight can formed of two tubular sections 12 and 14 which are joined together by means of an intermediate plug 16 forming a bearing member and which are closed by a top plug 18 and a bottom plug 20, said plugs being welded to the can. The intermediate plug is pierced by an axial gas-flow duct 21. The section 14 delimits with the bottom plug 20 and with the intermediate plug 16 a space 22 for the collection of fission gases. The column 24 of pellets of fuel material (sintered pellets of uranium dioxide and plutonium dioxide, for example) is supported on the plug 16 and separated from this latter by means of an intermediate component 26. Said column is thrust towards the plug 16 by a retaining spring 28 placed in an expansion space 31 which is intended to permit swelling of the fuel during irradiation. Said spring maintains the column 24 of pellets in position during the transportation and handling operations which take place prior to positioning within a reactor core.

The intermediate component 26 which is illustrated in FIG. 2 is constituted by a thick cylindrical disc in which are formed longitudinal and radial grooves. The component shown in FIG. 2 is provided with four longitudinal grooves 30 which are parallel to the axis of said component and located at 90° with respect to each other. Each flat face of the component 26 is hollowed-out so as to form two crossed radial grooves 29 which open into the longitudinal grooves 30. The width and the depth of the grooves 29 and 30 can be vary variable. However, the width is advantageously the same in the case of both the radial grooves and the longitudinal grooves and is such that the flat surface which remains on the radial faces represents a fraction which is substantially greater than one-half the cross-section of the can in order to provide a satisfactory seating for the fuel column. So far as the depth is concerned, this latter must be such that the component is not weakened to an excessive extent. The shape of the grooves is evidently chosen so as to facilitate manufacture and is of substantially rectangular cross-section, for example, with slightly relieved sides.

By way of example, it can be noted that an intermediate component 26 whose lateral wall was designed to leave a clearance of one or two tenths of a millimeter was employed in a can having an internal diameter of 5.65 mm. The component 26 was formed of sintered stainless steel and had a total height of 4 mm.

The intermediate component 26 can be fabricated in a number of different ways. The component can be shaped directly by powder metallurgy. By reason of its mechanical function, the component must not be brittle and its permissible density must be at least equal to 80 percent of the theoretical density of the constituent material (usually stainless steel). The component can also be fabricated by precision micro-casting.

The component 26 can obviously have shapes other than those which are illustrated in FIG. 2 and can be provided with a number of longitudinal grooves other than four: for example, provision could be made for six grooves in uniformly spaced relation. Three radial grooves are then formed on each flat face.

The intermediate component which is illustrated in FIG. 2 provides a passageway to the duct 21 which is formed in the plug 16 irrespective of the orientation of said component since said duct is axial. This result would not necessarily be achieved if provision were made not for one axial duct but for a plurality of uniformly spaced bores around the axis of the plug 16. In this case, it would be necessary to add to the radial grooves of the bottom face a circular distribution groove having a radius equal to that of the circle on which the bores of the plug are disposed.

The fuel element which is illustrated in FIG. 3 (in which the components corresponding to those of FIG. 1 are designated by the same reference numerals followed by the prime index) differs essentially from the fuel element of FIG. 1 in that it comprises two columns of pellets associated with a single gas-collection space and that the columns are supported at the time of handling operations by a retaining member of the type described and claimed in the co-pending patent application filed by the applicant company in respect of "Nuclear fuel element."

There is shown within the can, starting from the bottom plug 20', the fission-gas collection space 22' which is delimited by said plug 20' and by an intermediate plug 32 which is forcibly fitted in the can. A stack 36 of pellets of fertile material (natural uranium dioxide, for example) is supported on the spacer member 32 by means of a first intermediate component 34. A first split ring 38 maintains the stack of pellets 36 applied against the component 34 and separates said stack from a space for the expansion of the fertile material, said space being delimited by the intermediate plug 16'.

The column 24' of pellets of fissile material (mixed uranium and plutonium oxide, for example) is supported on the plug 16 by means of the intermediate component 26' which is identical with the component 34. The intermediate plug 16' is also pierced by a passageway 21' so as to permit the fission gas emanating from the pellets 24' to escape towards the fertile column 36, then to pass through a central duct 40 of said fertile member then through an axial passageway 42 of the spacer member 32 towards the gas collection space 22'. The column of pellets of fissile material 24' is held in position by a retaining member 44 which is mounted within the can and separated from the top plug 18' by an expansion space having a length which is greater than the distance over which the stack is capable of expanding.

What we claim is:

1. A nuclear reactor vertical fuel element comprising an elongated leak-tight can, a bearing member rigidly fixed in said can, at least one axial passage in said member, a column of fuel pellets carried by said bearing member said passage opening into a gas-collection space beneath said bearing member, an intermediate component slidably mounted within said can between said column of fuel pellets and said bearing member, a cylindrical wall and flat end faces for said intermediate component, longitudinal grooves in said cylindrical wall of said intermediate component establishing communication past said component and radial grooves in the flat end faces of said component opening into said longitudinal grooves and said radial grooves opening into said axial passage.

2. A nuclear reactor vertical fuel element comprising an elongated leak-tight can, a bearing member rigidly fixed in said can, at least one axial passage in said member, a column of fuel pellets carried by said bearing member, said passage opening into a gas-collection space beneath said bearing member, an intermediate component slidably mounted within said can between said column of fuel pellets and said bearing member, a cylindrical wall and flat end faces for said intermediate component, longitudinal grooves in said cylindrical wall of said intermediate component establishing communication past said intermediate component and radial grooves in the flat end faces of said intermediate component opening into said longitudinal grooves and said radial grooves opening into said axial passage, said intermediate component being a thick cylindrical disc provided on each face with two crossed radial grooves opening into longitudinal grooves which are parallel to the axis.

3. A nuclear fuel element according to claim 2, said bearing member being an intermediate plug interconnecting two can sections.

4. A nuclear fuel element according to claim 2 for a reactor of the upward coolant flow type, wherein said fuel element includes a plurality of columns of pellets each resting on a bearing member and separated therefrom by an intermediate component, a lowermost bearing member and a single fission-gas collection space located beneath the lowermost bearing member of the fuel element, the pellets of the column which rest on said lowermost bearing member having an axial duct.

* * * * *